United States Patent
Hachisuka et al.

(10) Patent No.: US 11,068,965 B2
(45) Date of Patent: Jul. 20, 2021

(54) INFORMATION PROCESSING DEVICE, INFORMATION PROCESSING METHOD, AND MOBILE OBJECT

(71) Applicant: SONY CORPORATION, Tokyo (JP)

(72) Inventors: Takumi Hachisuka, Tokyo (JP); Hiroshi Uji, Tokyo (JP); Kenichi Matsuhisa, Chiba (JP); Kazuma Yoshii, Tokyo (JP); Sho Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 206 days.

(21) Appl. No.: 16/077,802

(22) PCT Filed: Feb. 14, 2017

(86) PCT No.: PCT/JP2017/005246
§ 371 (c)(1),
(2) Date: Aug. 14, 2018

(87) PCT Pub. No.: WO2017/179282
PCT Pub. Date: Oct. 19, 2017

(65) Prior Publication Data
US 2019/0050936 A1    Feb. 14, 2019

(30) Foreign Application Priority Data

Apr. 14, 2016 (JP) .............................. JP2016-081059

(51) Int. Cl.
*G06Q 30/00* (2012.01)
*G06Q 30/06* (2012.01)
(Continued)

(52) U.S. Cl.
CPC ......... *G06Q 30/0635* (2013.01); *G01C 21/34* (2013.01); *G01C 21/3697* (2013.01);
(Continued)

(58) Field of Classification Search
CPC ...................................................... G06Q 30/00
See application file for complete search history.

(56) References Cited

U.S. PATENT DOCUMENTS

| | | | | |
|---|---|---|---|---|
| 6,119,095 A | * | 9/2000 | Morita | ................. G01C 21/343 705/5 |
| 7,698,062 B1 | * | 4/2010 | McMullen | ....... G08G 1/096844 701/438 |

(Continued)

FOREIGN PATENT DOCUMENTS

| | | |
|---|---|---|
| CN | 101578497 A | 11/2009 |
| EP | 2634536 A2 | 9/2013 |

(Continued)

OTHER PUBLICATIONS

Anacleto, Recardo et al, "Mobile application to provide personalized sightseeing tours", Journal of Network and Computer applications, dated Oct. 5, 2013. (Year: 2013).*

(Continued)

*Primary Examiner* — Mark A Fadok
(74) *Attorney, Agent, or Firm* — Chip Law Group

(57) ABSTRACT

There is provided an information processing device and an information processing method which are capable of processing information provided in a mobile object such as a vehicle and a mobile object. A calculation unit performs a process of extracting stores which can be stopped off or products or services which can be provided in each store on the basis of selection of a final destination, a boarding time, a purpose of boarding, a route, or a boarding course designated by a passenger via an input unit or information such as a budget or the like and giving a notification to the passenger through a display unit. Further, a driving route, an arrival time to a destination, and providable products or (Continued)

services are dynamically changed in response to selection of a product or a service by the passenger.

18 Claims, 10 Drawing Sheets

(51) Int. Cl.
    *G01C 21/34* (2006.01)
    *G06Q 10/02* (2012.01)
    *G06Q 50/10* (2012.01)
    *G06Q 30/02* (2012.01)
    *G01C 21/36* (2006.01)

(52) U.S. Cl.
    CPC ............ *G06Q 10/02* (2013.01); *G06Q 30/02* (2013.01); *G06Q 50/10* (2013.01)

(56) References Cited

U.S. PATENT DOCUMENTS

| | | | | |
|---|---|---|---|---|
| 7,958,008 | B1* | 6/2011 | Tillman | G07G 1/14 705/16 |
| 8,306,554 | B1* | 11/2012 | Jenkins | H04L 51/38 455/456.3 |
| 10,467,579 | B1* | 11/2019 | Reiss | G08G 1/20 |
| 2007/0291034 | A1* | 12/2007 | Dones | G09B 29/106 345/427 |
| 2010/0161446 | A1* | 6/2010 | Alfred | G10L 15/20 705/26.1 |
| 2010/0262362 | A1 | 10/2010 | Naito et al. | |
| 2012/0197690 | A1* | 8/2012 | Agulnek | G01C 21/3697 705/14.1 |
| 2013/0013411 | A1* | 1/2013 | Jenkins | H04W 4/029 705/14.58 |
| 2013/0054361 | A1* | 2/2013 | Rakshit | G06Q 30/0261 705/14.53 |
| 2013/0231859 | A1 | 9/2013 | Kim et al. | |
| 2015/0095122 | A1* | 4/2015 | Eramian | G07B 15/00 705/13 |
| 2015/0095197 | A1* | 4/2015 | Eramian | G06Q 30/0284 705/26.64 |
| 2015/0095198 | A1* | 4/2015 | Eramian | G06Q 30/0629 705/26.64 |
| 2017/0161651 | A1* | 6/2017 | Demarchi | G06F 16/9535 |
| 2019/0056233 | A1* | 2/2019 | Liu | G01C 21/3484 |

FOREIGN PATENT DOCUMENTS

| | | |
|---|---|---|
| JP | 2006-053646 A | 2/2006 |
| JP | 2006-134260 A | 5/2006 |
| JP | 2007-225504 A | 9/2007 |
| JP | 2010-140036 A | 6/2010 |
| JP | 2010-210236 A | 9/2010 |
| JP | 2011-232307 A | 11/2011 |
| JP | 2012-018177 A | 1/2012 |
| JP | 2013-015360 A | 1/2013 |
| JP | 2015-184821 A | 10/2015 |
| KR | 10-2013-0100549 A | 9/2013 |
| WO | 2009/008178 A1 | 1/2009 |

OTHER PUBLICATIONS

Borras, Joan et al., "Intelligent tourism recommender systems: A survey", Expert Systems with Applications, dated Jun. 9, 2014. (Year: 2014).*

International Search Report and Written Opinion of PCT Application No. PCT/JP2017/005246, dated May 9, 2017, 13 pages of ISRWO.

Office Action for JP Patent Application No. 2018-511897, dated Mar. 23, 2021, 9 pages of Office Action and 9 pages of English Translation.

* cited by examiner

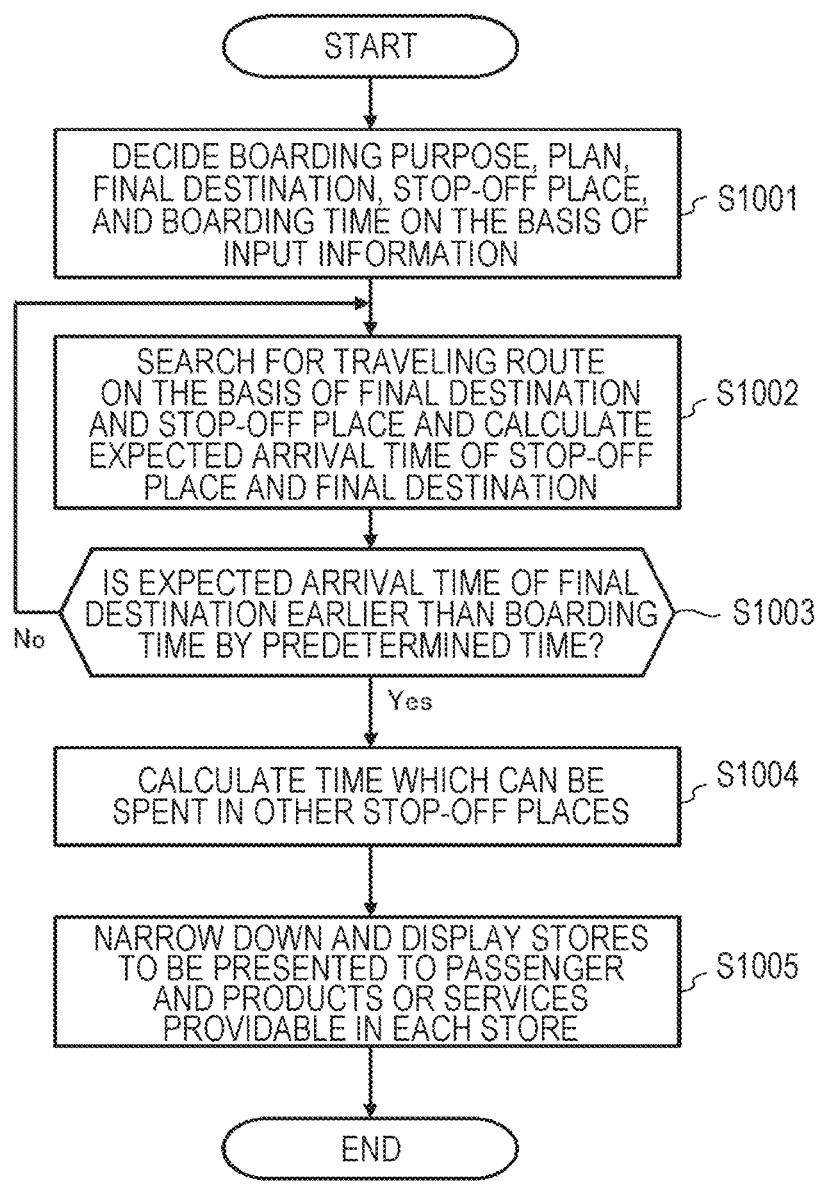

INFORMATION PROCESSING DEVICE, INFORMATION PROCESSING METHOD, AND MOBILE OBJECT

CROSS REFERENCE TO RELATED APPLICATIONS

This application is a U.S. National Phase of International Patent Application No. PCT/JP2017/005246 filed on Feb. 14, 2017, which claims priority benefit of Japanese Patent Application No. JP 2016-081059 filed in the Japan Patent Office on Apr. 14, 2016. Each of the above-referenced applications is hereby incorporated herein by reference in its entirety.

TECHNICAL FIELD

The technology disclosed in this specification relates to an information processing device, an information processing method which are capable of processing information provided in a mobile object such as a vehicle and a mobile object.

BACKGROUND ART

A technique of displaying a position of a store or the like providing products or services using a navigation function of an in-vehicle terminal or an information terminal such as a smartphone carried by a passenger in a vehicle has been already known. For example, an information processing device which places an order for a deliverable product on the basis of an expected arrival time of a vehicle and a product provision time has been proposed (for example, see Patent Document 1).

CITATION LIST

Patent Document

Patent Document 1: Japanese Patent Application Laid-Open No. 2015-184821

SUMMARY OF THE INVENTION

Problems to be Solved by the Invention

It is an object of the technology disclosed in this specification to provide an information processing device, an information processing method which are capable of processing information provided in a mobile object such as a vehicle and a mobile object.

Solutions to Problems

A technology disclosed in in this specification has been made in consideration of the above problem, and a first aspect thereof is an information processing device, including:

a presenting unit that presents information related to a store which can be stopped off from a traveling route of a mobile object together with an expected arrival time; and a processing unit that acquires information related to a product or a service provided by a store presented by the presenting unit and processes a procedure for reserving or purchasing the product or the service with an external device on the basis of selection of a user.

According to a second aspect of the technology disclosed in in this specification, the presenting unit of the information processing device according to the first aspect is configured to perform control such that the information related to the store is chronologically displayed in accordance with the expected arrival time.

According to a third aspect of the technology disclosed in in this specification, the information processing device according to the first aspect is configured such that the traveling route is decided on the basis of the selection of the user on the information related to the store presented by the presenting unit.

According to a fourth aspect of the technology disclosed in in this specification, the presenting unit of the information processing device according to the first aspect is configured to update the expected arrival time such that an expended time of the product or the service in the corresponding store is considered in response to selection of the information related to the store presented by the presenting unit or selection of the information related to the product or the service.

According to a fifth aspect of the technology disclosed in in this specification, the presenting unit of the information processing device according to the first aspect is configured to present the information related to the store including at least one of a place in which the product or the service is provided, a provision method, or a provision date and time together with the expected arrival time.

According to a sixth aspect of the technology disclosed in in this specification, the presenting unit of the information processing device according to the fifth aspect is configured to present an expected arrival time to a final destination of the mobile object with reference to an expended time in the store set as a transit point of the mobile object.

According to a seventh aspect of the technology disclosed in in this specification, the presenting unit of the information processing device according to the sixth aspect is configured to acquire the expended time in the store in accordance with the product or the service selected by the user and present the expected arrival time to the final destination of the mobile object.

According to an eighth aspect of the technology disclosed in in this specification, the presenting unit of the information processing device according to the seventh aspect is configured to update the transit point or the destination of the mobile object as the procedure for reserving or purchasing the product or the service is processed.

According to a ninth aspect of the technology disclosed in this specification, in the information processing device according to the first aspect, the procedure for reserving or purchasing the product or the service includes a process of deciding a date and time at which the product or the service is provided. Further, the presenting unit is configured to display a remaining time corresponding to the date and time at which the product or the service is provided.

According to a tenth aspect of the technology disclosed in in this specification, the presenting unit of the information processing device according to the first aspect is configured to select the information related to the store which performs presentation in accordance with a moving purpose, a preference of the user, or an expected getting-off time (a maximum time to be able to ride in the mobile object) input by the user or a transit point or a destination previously set as the traveling route of the mobile object.

According to an eleventh aspect of the technology disclosed in in this specification, the presenting unit of the information processing device according to the first aspect is configured to present the information related to the store including the information related to the product or the service provided by the store.

According to a twelfth aspect of the technology disclosed in this specification, the information processing device according to the first aspect further includes a communication unit that communicates with an external device. Further, the communication unit is configured to transmit to the external device information related to a date and time or a place at which the product or the service is provided in accordance to selection by the user.

According to a thirteenth aspect of the technology disclosed in in this specification, the presenting unit of the information processing device according to the first aspect is configured to present the information related to the store in view of an expected arrival time to the store and a time required to provide the product or the service provided by the store.

According to a fourteenth aspect of the technology disclosed in in this specification, the presenting unit of the information processing device according to the thirteenth aspect is configured to present information indicating that the product or the service is providable before the expected arrival time or information indicating that a standby time is required before the product or the service is provided after the expected arrival time.

According to a fifteenth aspect of the technology disclosed in in this specification, the presenting unit of the information processing device according to the first aspect is configured to present the information related to the store in accordance with the number of persons in the mobile object.

According to a sixteenth aspect of the technology disclosed in in this specification, the presenting unit of the information processing device according to the fifteenth aspect is configured to present a commercial facility which can be stopped off from the traveling route, a destination, and the expected arrival time on the basis of a purpose of boarding, an area which is desired to pass through while boarding, a budget spendable for using an item, a final destination, and a boarding time input by the user.

Further, a seventeenth aspect of the technology disclosed in in this specification is an information processing method, including:

a presenting step of presenting information related to a store which can be stopped off from a traveling route of a mobile object together with an expected arrival time; and a processing step of acquiring information related to a product or a service provided by a store presented by the presenting unit and processing a procedure for reserving or purchasing the product or the service with an external device on the basis of selection of a user.

Further, an eighteenth aspect of the technology disclosed in in this specification is a mobile object, including:

a driving unit that generates driving force;

a presenting unit that presents information related to a store which can be stopped off from a traveling route together with an expected arrival time; and a processing unit that acquires information related to a product or a service provided by a store presented by the presenting unit and processes a procedure for reserving or purchasing the product or the service with an external device on the basis of selection of a user.

EFFECTS OF THE INVENTION

According to the technology disclosed in this specification, it is possible to provide an information processing device, an information processing method which are capable of processing information provided in a mobile object such as a vehicle and a mobile object.

Note that the effects described in this specification are merely examples, and the effects of the present invention are not limited thereto. Further, the present invention may have additional effects in addition to the above effects.

Still other objects, features, and advantages of the technology disclosed in this specification will become apparent from detailed description based on embodiments described below and the appended drawings.

BRIEF DESCRIPTION OF DRAWINGS

FIG. 10 is a flowchart illustrating a detailed processing procedure for displaying stores on a traveling route and products or services which can be provided in each store on a GUI screen.

MODE FOR CARRYING OUT THE INVENTION

Hereinafter, embodiments of the technology disclosed in this specification will be described in detail with reference to the appended drawings.

Figure 1:
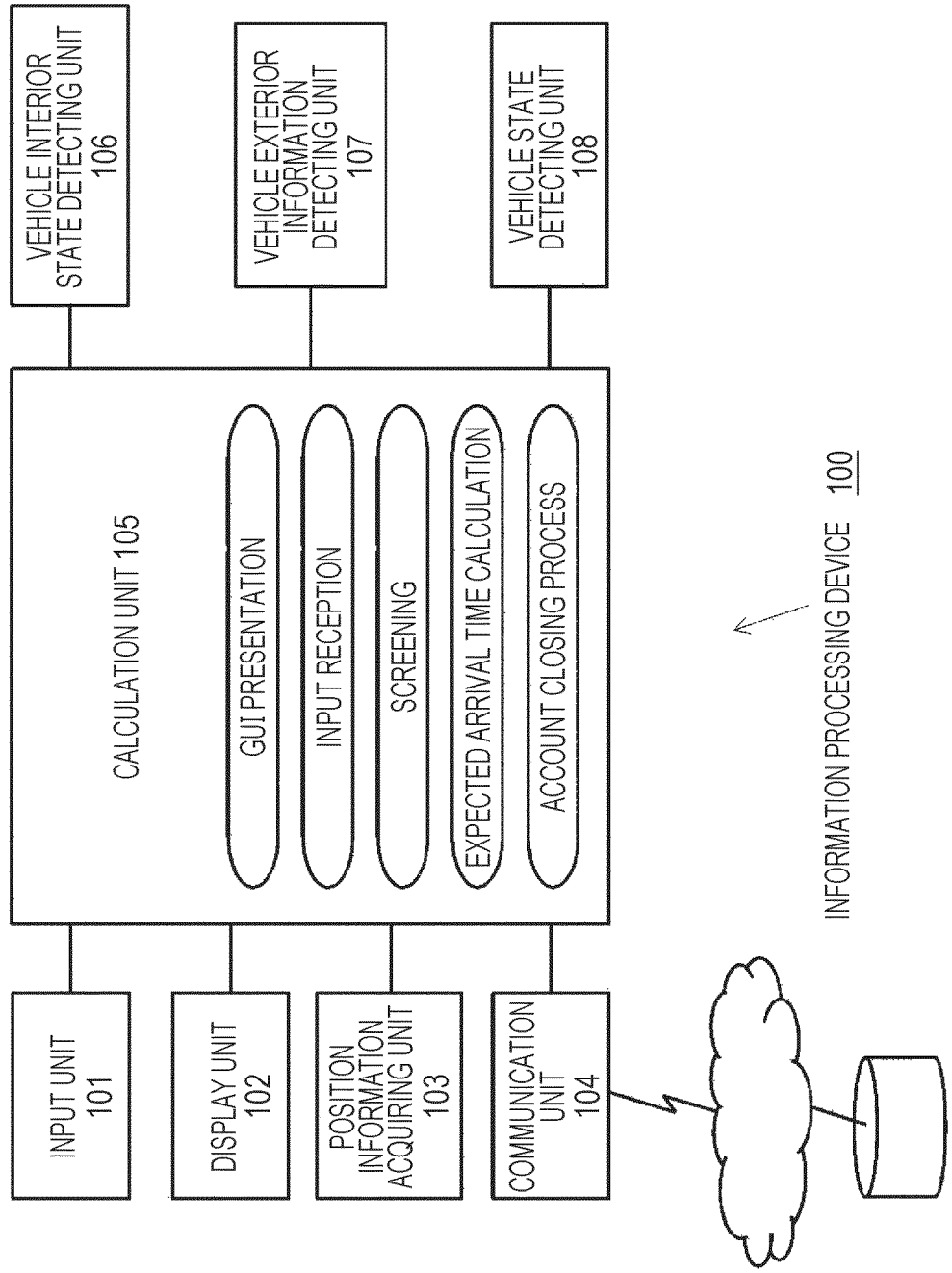
FIG. 1 is a diagram schematically illustrating a functional configuration of an information processing device 100 that processes information to be provided to a passenger in a vehicle.

FIG. 1 schematically illustrates a functional configuration of an information processing device 100 which processes information to be provided to a passenger in a vehicle (or a mobile object capable of generating driving force for traveling on a road) to which the technology disclosed in this specification is applied. The illustrated information processing device 100 includes an input unit 101, a display unit 102, a position information acquiring unit 103, a communication unit 104, and a calculation unit 105.

The information processing device 100 may be integrated with a vehicle (or incorporated into a vehicle) or may be configured physically independently of a vehicle. For example, the information processing device 100 may be configured to be carried by a passenger. Further, the information processing device 100 may be configured such that some functional modules are shared by a device incorporated into the vehicle.

The input unit 101 is a device by which the passenger performs an input to the information processing device 100. The passenger can input information used in selection of a final destination, a boarding time, a purpose of boarding, a traveling route, or a boarding course, an input of a budget or the like, that is, selection of a driving route or a stop-off place to the information processing device 100 via the input unit 101.

The input unit 101 may include, for example, a touch panel or a voice input function. Further, an information terminal such as a smartphone carried by the passenger may double as the input unit 101. Further, here, the passenger is assumed to include a driver and a passenger other than the driver. Further, in the case of an in-service vehicle such as a taxi or a limousine, the passenger is assumed to include only the passenger other than the driver. In addition, in the case of a vehicle which is performing complete automatic driving, the driver and the passenger are not distinguished.

The display unit 102 displays and outputs a screen of a result calculated by the information processing device 100. Specifically, a graphical user interface (GUI) screen for guiding selection of a final destination, a boarding time, a purpose of boarding, a traveling route, or a boarding course, an input of a budget, or the like to the passenger, a GUI screen of a calculation result based on information input by the passenger via the input unit 101, or the like is displayed (described later).

The display unit 102 includes, for example, a touch panel and may be integrated with the input unit 101. Further, an in-vehicle device such as an onboard display, a head up display, a car navigation may double as the display unit 102, or a screen of an information terminal such as a smartphone carried by the passenger may be used as the display unit 102.

The position information acquiring unit 103 acquires information related to a current place of the vehicle. For example, the position information acquiring unit 103 receives global navigation satellite system (GNSS) signals from GNSS satellites (for example, global positioning system (GPS) signals from GPS satellites), performs positioning, and generates position information including a latitude, a longitude, and an altitude of the vehicle. Alternatively, the position information acquiring unit 103 may specify the current place on the basis of electrically measured information from a wireless access point using PlaceEngine (registered trademark) or the like. Further, the position information acquiring unit 103 may acquire position information from an information terminal such as a positioning unit of the vehicle or a smartphone carried by a passenger.

The communication unit 104 includes a general-purpose communication interface that supports a cellular communication protocol such as global system of mobile communications (GSM (registered trademark)), WiMAX, Long Term Evolution (LTE), or LTE-A (LTE-Advanced), wireless LAN such as Wi-Fi (registered trademark), and Bluetooth (registered trademark), or the like, for example, and can establish a connection with devices (for example, an application server, a control server, a management server, or the like) located in an external network (for example, the Internet, a cloud network, or a network specific to a service provider).

In the present embodiment, in order to be provided with a product or a service selected by the passenger through the input unit 101, information exchange related to an order, a payment, and the like with the outside such as a store can be performed through the communication unit 104. For example, the information processing device 100 can receive information related to products or services (hereinafter referred to as "services") which can be provided from each store to the passenger. Further, the store side may narrow down to available products or services which are prepared in time for an expected arrival time (for example, dishes which can be cooked before the vehicle arrives at the store) and transmit real-time information. In addition, here, the stores include retail shops, commercial facilities such as shopping malls, restaurants, sightseeing spots, and landmarks (the same hereinafter).

The calculation unit 105 controls an operation of the entire information processing device 100 as a whole. Specifically, the calculation unit 105 performs processing of the display screen of the display unit 102 based on information input from the passenger via the input unit 101, processing of a GUI for helping the passenger perform an input manipulation easily, information communication with an external device via the communication unit 104, and the like.

In the present embodiment, the calculation unit 105 performs a process of extracting stores which can be stopped off or items (products or services) which can be provided in each store on the basis of selection of the final destination, the boarding time, the purpose of boarding, or the boarding course designated by the passenger via the input unit 101 or information such as the budget or the like and giving a notification to the passenger through the display unit 102. Further, in response to the selection of the product or the service by the passenger, the calculation unit 105 dynamically changes the traveling route or the arrival time to the destination, and repeatedly executes re-extraction of the products or the services which can be provided and the notification to the passenger.

The information processing device 100 may further include a vehicle interior state detecting unit 106, a vehicle exterior information detecting unit 107, and a vehicle state detecting unit 108.

The vehicle interior state detecting unit 106 includes, for example, an in-vehicle camera (driving monitor camera) or a thermo camera for capturing the inside of the vehicle, a biometric sensor for detecting biometric information of the driver or each passenger (sweating, a body temperature, a heart beat, or the like), a load sensor for detecting a load applied to a driver seat or other seats (a front passenger seat, rear seats, or the like) (whether or not a person sits on the seat) or a change in a weight of the passenger compartment, an audio sensor such as a microphone, and the like.

For example, it is possible to check the presence or absence of the passenger on the basis of a recognition result of an image captured by the driving monitor camera or a weight change of the seat or the passenger compartment obtained by the load sensor. Further, it is possible to estimate a consumption status of the product or the service provided in the passenger compartment (for example, whether or not a meal which is bought and serviced in the vehicle is done) on the basis of the recognition result of the image captured by the driving monitor camera. Further, it is possible to estimate a degree of satisfaction of the passenger for the product or the service provided in the passenger compartment on the basis of a face recognition result of an image captured by the driving monitor camera, content of a conversation inside the vehicle collected by the audio sensor, a detection result of the biometric sensor, or the like.

In response to confirming of boarding on the basis of the detection result of the vehicle interior information detecting unit 106, the calculation unit 105 can start a process of providing information into the passenger compartment. The calculation unit 105 may also revise the product or the service to be next presented to the passenger on the basis of a usage status of the product or the service estimated from the detection result of the vehicle interior state detecting unit 106 (for example, performs the process of extracting a store and products or services to be presented next excluding similar dishes or stores when there are unfinished dishes or leftover dishes). Further, the calculation unit 105 may successively learn the degree of satisfaction of the passenger estimated from the detection result of the vehicle interior state detecting unit 106 and use the learning result for the process of extracting the products or the services when the same passenger (or other passengers) appears next time.

The vehicle exterior information detecting unit 107 includes, for example, an environmental sensor or the like for detecting a current weather or a meteorological phenomenon, a surrounding information detection sensor for detecting a surrounding vehicle, an obstacle, a passerby, an accident situation occurring around the vehicle, and the like.

The calculation unit 105 may appropriately change information to be provided in the passenger compartment on the basis of the detection result of the vehicle exterior information detecting unit 107. For example, it is because what the passenger wants to eat or a place to which the passenger stops off may change on the basis of a weather or a meteorological phenomenon (for example, the passenger wants to eat cold food on an unseasonably hot day but wants to eat warm food on an unseasonably cold day). Further, it is assumed that the passenger does not want to stop off or has not to stop off a place which is originally desired to be stopped off depending on surrounding circumstances such as circumstances in which a road on which it is traveling is congested or there is an accident.

The vehicle state detecting unit 108 includes, for example, a gyro sensor for detecting an angular velocity of an axial rotational motion of a vehicle body, an acceleration sensor for detecting acceleration of the vehicle, a sensor for detecting a manipulated variable of an accelerator pedal, a manipulated variable of a brake pedal, a steering angle of a steering wheel, the number of revolutions of an engine, a rotating speed of wheels, and the like.

The calculation unit 105 may dynamically change information to be provided in the passenger compartment in accordance with the detection result of the vehicle state detecting unit 108 (for example, the failure of the vehicle).

The information processing device 100 according to the present embodiment gives a notification indicating the products or the services which can be provided by the stores near the traveling route to the passenger within the moving vehicle and dynamically changes the traveling route or the schedule (for example, automatically update an arrival time to the transit point or the final destination) in response to the selection of the product or the service by the passenger. The notification to the passenger is basically performed through the GUI screen. Further, the information processing device 100 can also perform a payment process through the GUI screen in accordance with the usage of the product or the service by the passenger (purchase, reservation, or the like).

Further, in the present embodiment, setting (including changing) the traveling route of the vehicle includes both setting a transit point, a destination, and a traveling route in a vehicle in an automatic driving mode and setting a transit point, a destination, and a traveling route on an application related to navigation in a vehicle in a manual driving mode.

Here, methods of presenting information to the passenger and the like are described and listed below. In addition, it is assumed that the display unit 102 configured with an in-vehicle device, an information terminal carried by the passenger, or the like is used for information presentation, and information is basically presented in the form of a GUI.

(ex.1) A plurality of stores extracted in accordance with the traveling route is chronologically displayed through a GUI with an expected arrival time of the vehicle.

(ex. 2) A remaining time for receiving the products or the services which can be provided in each store timely is displayed using a progress bar or the like.

(ex. 3) The products or the services which can be provided in each store are presented through a GUI (to be described later), and selection of the product or the service from the passenger is received on the screen. Further, depending on the product or the service selected by the passenger, the expected arrival time to the final destination is changed in consideration of a time until it is provided (for example, a time until the product is delivered). Alternatively, in a case in which the expected arrival time is fixed, subsequent stores to be displayed through the GUI may be sequentially screened in view of a time to use the selected product or service (for example, a time obtained by subtracting a time spent in a stop-off store from a remaining time).

(ex. 4) In a case in which a store extracted in accordance with the traveling route is a restaurant, information such as a menu or the like is presented to the passenger with food and drink which can be provided at the expected arrival time of the vehicle limited. In the case of a store that provides food and drink, screening of a providable menu is performed in consideration of a cooking time in the store as well as the expected arrival time of the vehicle to the store (a product that is unable to be cooked and delivered by the expected arrival time of the vehicle may be excluded from the menu). Further, restaurants are assumed to include restaurants, fast food stores, stores which provide take-out and delivery services, and the like. In a case in which the delivery service is used, information related to a product receiving method is also presented. For example, a product receiving place is set on the traveling route (or a spot very close to the traveling route), and screening is performed further in consideration of a delivery time from the store to the receiving place.

(ex. 5) Among the products or the services offered in each store, there are products or services that require the passenger to get off when using the products or the services. There are cases in which a person who uses the product or the service is required to get off, or there are cases in which other people can receive the product instead. For example, there are cases in which the product is delivered to a place on the traveling route or a nearby receiving place, or there are cases in which a service of receiving a treatment such as a massage is provided. Further, information related to the receiving method including information indicating whether or not it is necessary to get off in using each product or service, for example, is also displayed on the GUI screen which presents the product or the service to the passenger. Here, the "receiving method" corresponds to a "delivery method" on the store side.

(ex. 6) The traveling route (the transit point or the final destination) may be changed as the passenger confirms the selection of the product or the service, that is, confirms the order. For example, a subsequent store in which a product or a service similar to a confirmed order is intended to be used may be excluded from the transit point. Here, an order recipient store (or the receiving place of the product in which the order is confirmed) is inevitably included in the traveling route.

(ex. 7) The following information is associated with each store such as a store, and when store information is presented to the passenger, relevant information is also presented together.

receiving place of product or service, or deliverable area delivery method of product or service (whether drive through is possible or it is necessary to get off)

payment method

The stores to be presented to the passenger and the products or the services which can be provided in the stores may be screened appropriately. For example, it is preferable to perform screening in a case in which there is a plurality of stores on the traveling route or there is a plurality of types of products or services which can be provided by the store, and it is difficult to present all products or services through the GUI screen, or it is difficult to the passenger to view them. The screening methods for information provided in the vehicle by the information processing device 100 are described and listed below.

(ex. 11) The stores to be presented and the product s or the services which can be provided in the stores may be screened on the basis of a moving purpose of the passenger or personal information of the passenger. For example, the moving purpose (tourism, eating, commuting, date, party, or the like) is estimated on the basis of the purpose of boarding, the boarding course, or the like input in the GUI screen (to be described later) presented at a time when the passenger gets on the vehicle, and screening for the stores and the products or the services suitable for them is performed. Further, information related to preference of the passenger (music, food, sports, or the like) is acquired, and screening for the stores and the products or the services suitable for them is performed. For example, screening for restaurants of a favorite genre of the passenger, a stadium of a favorite sport game of the passenger, a special agent of a favorite team, and the like is performed. Examples of a method of acquiring the personal information of the passenger include a method in which the personal information is input by the passenger via the input unit 101, a method in which the personal information is estimated on the basis of an accumulated behavior history of the passenger by the information processing device 100, a method in which the personal information is acquired from an information terminal carried by the passenger, and the like.

(ex. 12) The screening for the stores or the products or the services is performed on the basis of a boarding time. Screen of whether or not a time needed for using each store and each product or service provided in each store (for example, a time until eating is done after the passenger enters a store) is within a time of an expected getting-off time is performed. For example, in the case of vehicles rented on an hour basis such as rent-a-cars, limousines, and chartered buses, a boarding time is set. Here, the expected getting-off time may be a maximum time in which the passenger can ride in the vehicle.

(ex. 13) Food and drink offerings in a plurality of places are proposed in accordance with the traveling route.

(ex. 14) The screening for the stores or the products or the services is performed on the basis of the destination or the transit point (stop-off places except the stores).

(ex. 15) The preference of the passenger is estimated on the basis of a recognition result for a conversation in the vehicle, and the screening for the stores or the products or the services is performed in accordance with the estimation result.

(ex. 16) The screening is performed in accordance with the store and the product or the service which is previously used by the passenger during boarding. For example, dishes or stores which are similar are excluded, and screening for the stores and the products or the services to be presented next is performed.

(ex. 17) The screening for the products or the services to be presented to the passengers next is performed on the basis of a usage status of the product or the service in the vehicle. For example, in a case in which similar dishes or drinks can be provided in a plurality of stores on the traveling route, an unfinished dish or a leftover dish are determined on the basis of a vehicle interior image captured by the driving monitor camera, and when the vehicle approaches a next store, screen for a menu excluding the same dish or drink is performed.

(ex. 18) The screening for the stores and the products or the services is performed in accordance with an order history, a usage status, or the number of persons. For example, in a case in which the same dish or drink is repeatedly ordered in the vehicle, it is continuously presented to the passenger, but in a case in which there is a leftover dish or drink, it is determined whether or not the same dish or drink is presented depending on a leftover quantity thereof. Further, screening is performed so that an appropriate quantity of dishes and drinks are always prepared in the vehicle depending on an order frequency or a leftover quantity of dishes and drinks or the number of passengers in the vehicle.

(ex. 19) A physical condition or a satiety or hunger level of the passenger is estimated on the basis of a recognition result for the passenger from an image captured by the driving monitor camera or a detection result of a biometric sensor, and it is determined whether or not a leftover quantity in the vehicle is appropriate. If the leftover quantity is equal to or more than the appropriate quantity, the same dish or drink may not be presented, and if the leftover quantity is less than the appropriate quantity, the same dish or drink may be presented.

(ex. 20) The number of stores and the number of products or services is narrowed down in accordance with a viewing time (a remaining time). For example, in accordance with the remaining time till the expected arrival time to the final destination, the number of stores to be presented, and the number of products in each store are narrowed down.

(ex. 21) The screening for the stores and the products or the services is performed in accordance with expected arrival time. For example, among products or services which can be provided in the store which the passenger can stop off in, products or services in which it is unable to arrive at the final destination by the expected arrival time or the boarding time is exceeded when used are not presented. Further, the information processing device 100 side may estimate the cooking time of the dish and determine whether or not it is prepared in time for the expected arrival time, or the store side may perform screening for the menu and transmit information to the information processing device 100.

(ex. 22) The screening for the products or the services is performed in accordance with a budget of the passenger. For example, among the products or the services which are prepared in time for the expected arrival time, the products or the services which exceed the budget set by the passenger are excluded, and the presentation is performed.

(ex. 23) The screening for the products or the services is performed in accordance with the traveling route or the transit point (the stop-off place) of the vehicle or the usage history. For example, recommended souvenirs to be purchased or reserved are estimated from the traveling route or the stop-off place (sightseeing spots or the like) until now, and stores in which recommended souvenirs which have not been purchased yet with reference to the previous purchase history of the passenger can be purchased are presented.

Further, if a notification indicating the products or the services is given to the passenger, there is merit such as advertising for a management side of a store (for example, a store which sells the products). The information processing device 100 may extract stores to be presented freely (or unlimitedly) on the basis of the traveling route of the vehicle or may extract stores to be presented from among stores which are associated in terms of business cooperation in advance.

The information processing device 100 gives a notification indicating the stores and the products or the services which can be provided in the store which have been screened to the passenger using the GUI at a timing corresponding to the expected arrival time to each store. Basically, information related to the store is presented a predetermined time (for example, 15 minutes) before the expected arrival time. This is because the passenger has to return in order to use the store which has been passed already. Further, it is preferable that products or services which require a standby time until available after the order is confirmed such as dishes which require a cooking time be presented a time needed before the expected arrival time.

Further, when there are a large number of passengers, it takes time for everyone to select a menu. In this regard, a predetermined time at which the notification is given in advance before the expected arrival time may be adjusted in accordance with the number of passengers (the number of passengers or the number of persons who selects a menu). If the number of ordered menus is increased as the time is increased, a degree of satisfaction of the passenger is improved, and there is a merit for the store side which receives orders.

The passenger can communicate with a corresponding store such as a store on the basis of the information of the products, the services, or the like notified from the information processing device 100. The information processing device 100 automatically establishes a connection with the store in which the passenger selects or confirms an order using the communication unit 104. Then, the passenger can perform voice communication or video communication with (a manager of) the store.

As described above, the information processing device 100 presents the products or the services of the store together with the information related to the product receiving method. It is preferable that the information related to the receiving method be a GUI in which a receiving place or a receiving time zone can be designated by the passenger. The receiving place may be set to a spot on the traveling route or at a spot close to the traveling route, and the passenger may visit the store to pick up it. Further, in a case in which the receiving method is confirmed, the information processing device 100 may continuously transmit position information of the vehicle to the order recipient store until it is picked up.

Further, the information processing device 100 may be able to change the product receiving method which is confirmed once later. Even after a dish is ordered to be delivered, the receiving method is automatically changed in accordance with the leftover quantity. For example, in a case in which the receiving time zone comes or the vehicle approaches the receiving place, but the dish still remains in the vehicle, the receiving time zone may be automatically changed to a time zone in which the leftover quantity is less than a predetermined quantity. Further, as the receiving time zone is changed, a nearby spot in which the time zone becomes the predicted arrival time of the vehicle may be automatically changed as the receiving place. For example, in a case in which a dish is ordered to a store chain, an order placed to the stopped-off store may be automatically transferred to the changed receiving place.

Further, the information processing device 100 can also perform a payment process for the product or the service used (order) by the passenger. A parental control function may be introduced in the payment process. For example, it is determined whether or not the passenger who selects a product or the service is a person having no sufficient responsibility such as a child on the basis of a face recognition result of an image captured by the driving monitor camera or the like, and restriction is implied so that the order is not confirmed indiscriminately.

Further, the information processing device 100 may have a function of automatically setting a person who makes payment in a case in which there is a plurality of passengers in the vehicle (more strictly, in a case where there is a plurality of passengers using the ordered product or service). For example, a person who makes payment may be designated in accordance with the seating place of each passenger. In a case that it is possible to identify a social status of each passenger or a human relationship between the passengers, it is possible to designate a person who makes payment on the basis of such information. Further, instead of designating one person who makes payment, a plurality of persons may be selected and may share payment. In this case, instead of equally dividing the payment, weighting may be applied in accordance with the social status of each passenger or the human relations between the passengers, and then each passenger may make payment. Of course, the payment may be divided by excluding a passenger having no payment ability such as a child.

Figure 2:
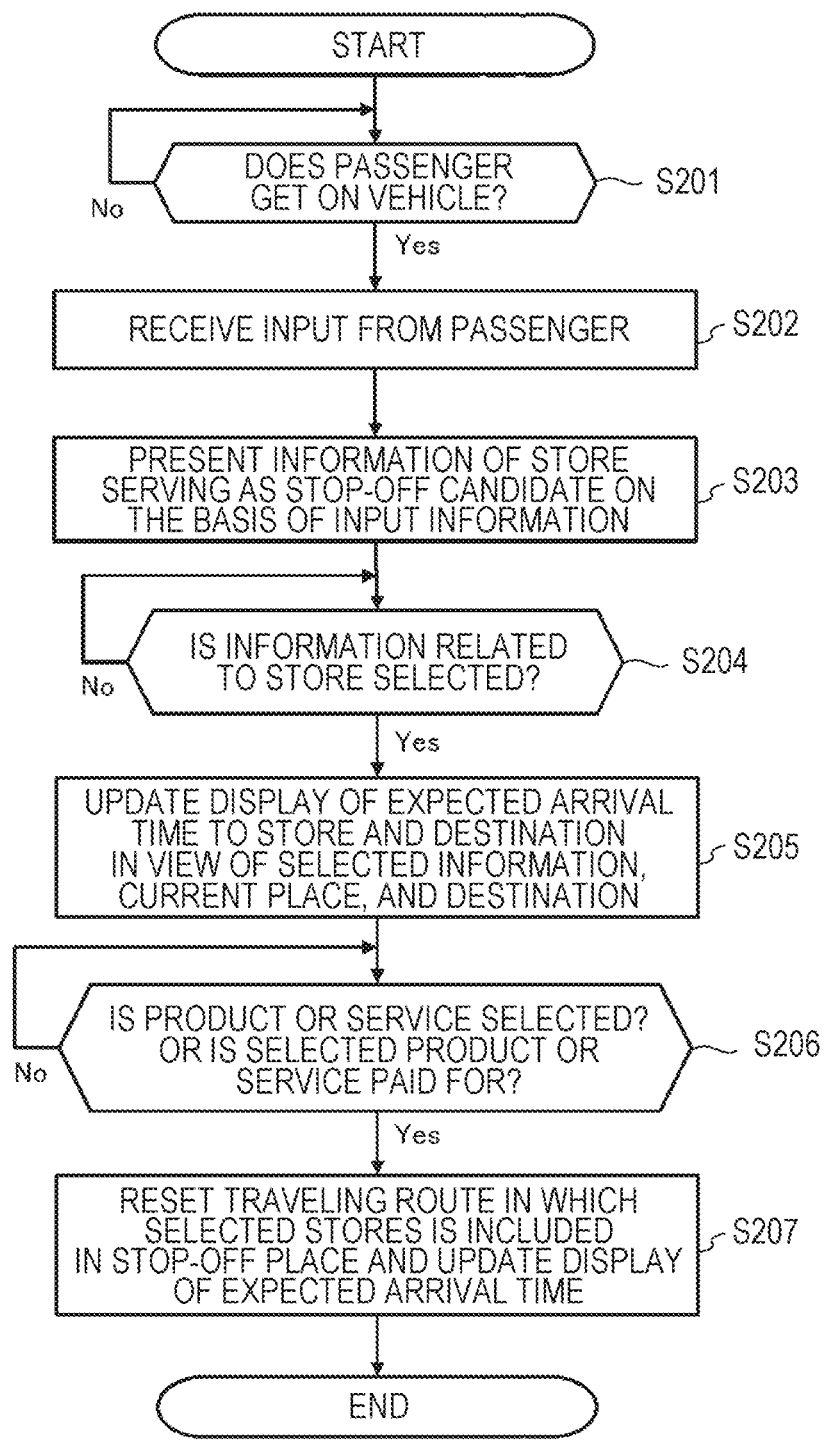
FIG. 2 is a flowchart illustrating a basic processing procedure in which an information processing device 100 performs information presentation in a vehicle.

FIG. 2 is a flowchart illustrating a basic processing procedure in which the information processing device 100 performs the above-described information presentation to the passenger in the vehicle.

The processing procedure starts when the passenger gets on the vehicle (Yes in step S201). For example, it is possible to confirm whether or not the passenger gets on the vehicle on the basis of a captured image of the driving monitor camera or the detection result of the vehicle interior state detecting unit 106 such as the load sensor.

The information processing device 100 presents the GUI screen in which the passenger designates information related to traveling of the vehicle through the display unit 102, and receives an input from the passenger (step S202).

Figure 3:
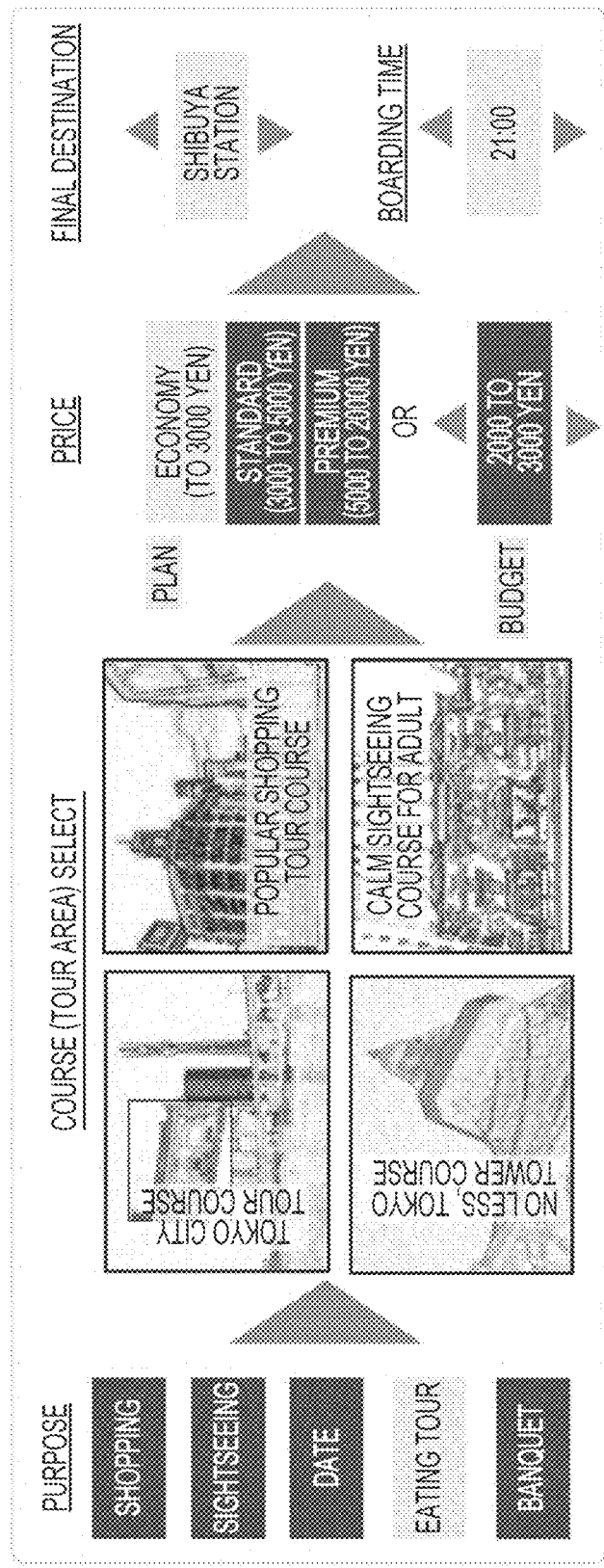
FIG. 3 is a diagram illustrating a configuration example of a GUI screen in which a passenger designates information related to traveling of a vehicle.

FIG. 3 illustrates a configuration example of the GUI screen which is presented to the passenger in step S202 so that the passenger designates information related to traveling of the vehicle. On the GUI screen illustrated in FIG. 3, the passenger can designate the purpose of boarding, a geographical area desired to pass through while boarding, a budget (a plan or price range) which can be spent for purchase of the product or the service before arriving at the destination, a final destination, and a boarding time (a time at which it is possible to get on before arriving at the final destination) through a menu selection manipulation or the like. FIG. 3 illustrates an example in which the purpose is set to "eating tour," the course is set to "Tokyo city (passing through Asakusa)," an "economy" plan in which a budget is 3000 yen or less is selected, the final destination is set to "Shibuya station," and the boarding time is set to "21:00."

In addition, instead of a method in which the passenger performs the input through the GUI screen illustrated in FIG. 3, information previously stored in an external server or an information terminal carried by the passenger is read from the communication unit 104 or the like, and information similar to that input on the GUI screen may be acquired by the information processing device 100.

Then, the calculation unit 105 obtains the traveling route on the basis of the information regarding to the traveling of the vehicle input from the passenger in step S202, extracts available stores and products or services which can be provided in each store in accordance with the traveling route, and displays such information for the passenger through the display unit 102 as the GUI screen (step S203).

For example, if the traveling route of the vehicle which is suitable for the purpose designated by the passenger or the course selected by the passenger and predicted to be able to reach the final destination without being late for the boarding time is found out, the calculation unit 105 extracts available stores and products or services which can be provided in each store in accordance with the traveling route. Further, the calculation unit 105 may performs the screening for the stores and the products or the services (described above) on the basis of the purpose of boarding, the boarding course, and the budget designated on the GUI screen illustrated in FIG. 2 and the personal information such as the preference of the passenger.

Figure 4:
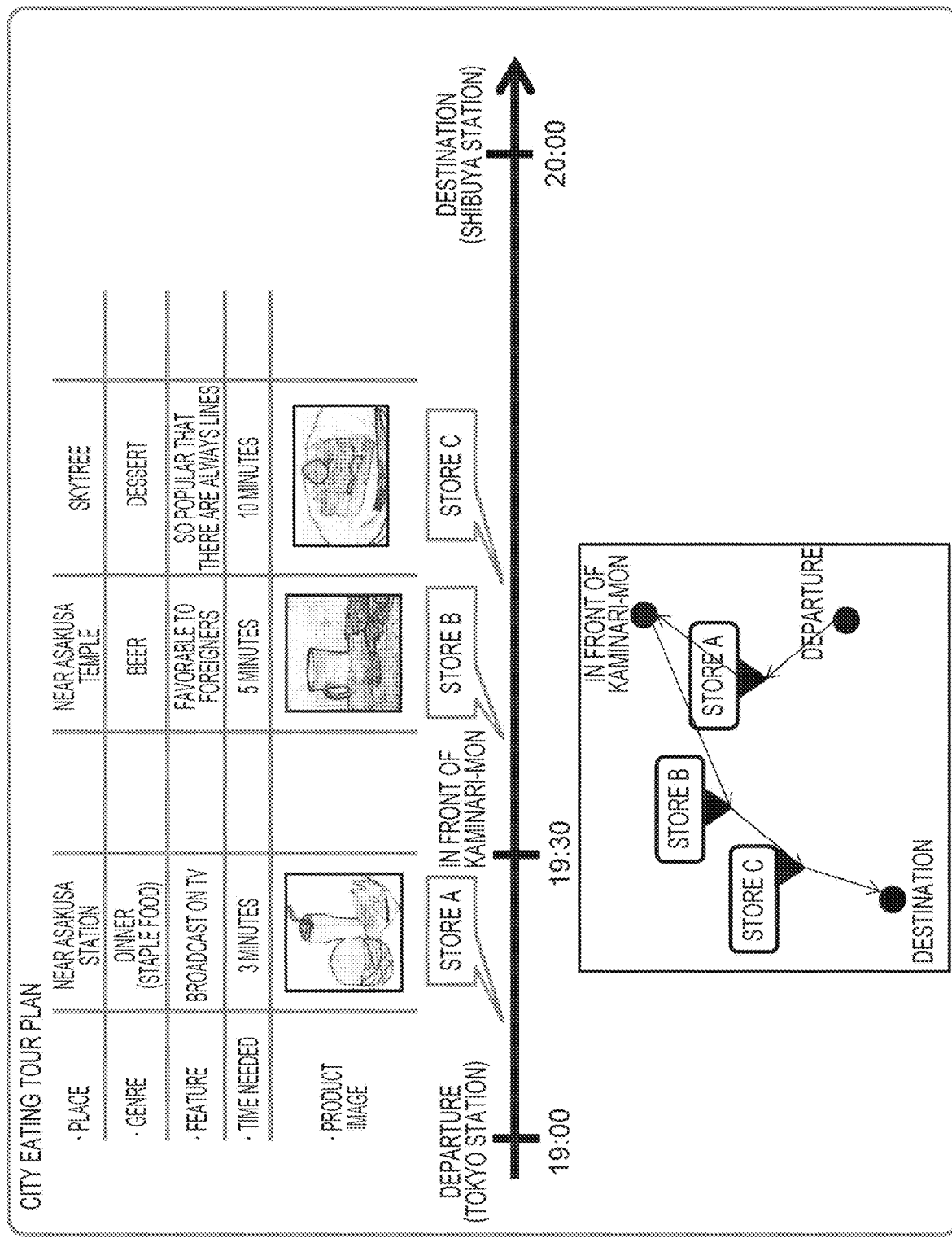
FIG. 4 is a diagram illustrating a configuration example of a GUI screen for presenting a traveling route, stores available in a driving route, and products or services which can be provided in each store.

FIG. 4 illustrates a configuration example of the GUI screen for presenting a traveling route, available stores in the traveling route, and products or services which can be provided in each store. In the GUI screen illustrated in FIG. 4, the traveling route and icons of stores (a store A, a store B, and a store C) are displayed on a map together with a stop-off place (in front of Kaminari-mon). Further, in the same GUI screen, a time axis indicating a route plan is displayed. The time axis includes a parallel straight line in which a departure ("Tokyo station" in the example illustrated in FIG. 4. It may be a current place of the vehicle other than the departure point) and a destination ("Shibuya station" in the example illustrated in FIG. 4) are left and right endpoints. The icons of the stores and the stop-off place are chronologically displayed on this time axis in accordance with the predicted arrival time to each store or each stop-off place.

Further, in the same GUI screen, information related to the respective stores is displayed in a matrix form. In FIG. 4, it is simplified and illustrated for the sake of convenience, but preferably, (1) a name and a place of a store, a place to which a product is delivered, an area in which a product can be delivered, a delivery method (by hand, whether or not it is necessary for the passenger to get off, or the presence or absence of a product transportation means to a specific place such as delivery, a payment method related to product transaction, (2) products or services provided by the store, an expected time until a product or a service is delivered to a delivery place after an order is received, and the like are included as the information related to the store. All stores such as leisure facilities, various kinds of stores, shopping malls, restaurants, and convenience stores are assumed.

Each of cells (a place, a genre, a feature, and product image) in the matrix displaying information related to each store is a selectable menu button. If the passenger selects a cell, another data candidate group having the same attribute is displayed in a pull-down menu (not illustrated), and when the passenger designates another data candidate, the screen is updated to display of similar information related to the data candidate. Further, if a swiping manipulation (of sliding in a touched state with a fingertip) is performed on each of the icon (the stores A to C), switching to candidates of other stores having similar conditions (a place, a genre, and a feature) is performed.

For example, the passenger can select the store desired to be stopped off by indicating an icon on the map or a chronological line indicating the traveling route on the GUI screen illustrated in FIG. 4. Further, the passenger can select the product or the service desired to be used in the store by indicating the corresponding cell on the matrix. Here, at this stage, it is not confirmed as the destination yet.

If the passenger selects the icon of the store as the destination candidate on the GUI screen illustrated in FIG. 4 or selects a cell corresponding to the product or the service provided by a store serving as purchase candidate (a stage in which it is not confirmed as the destination yet) and selects information related to the store (Yes in step S204), the calculation unit 105 re-calculates the expected arrival times to the stop-off place and each store in a case in which the traveling route in which the corresponding store is further included as the stop-off place is set in view of the information related to the selected store, the current place of the vehicle, and the destination, and updates the display of each expected arrival time on the time axis of the GUI screen (step S205).

Figure 5:
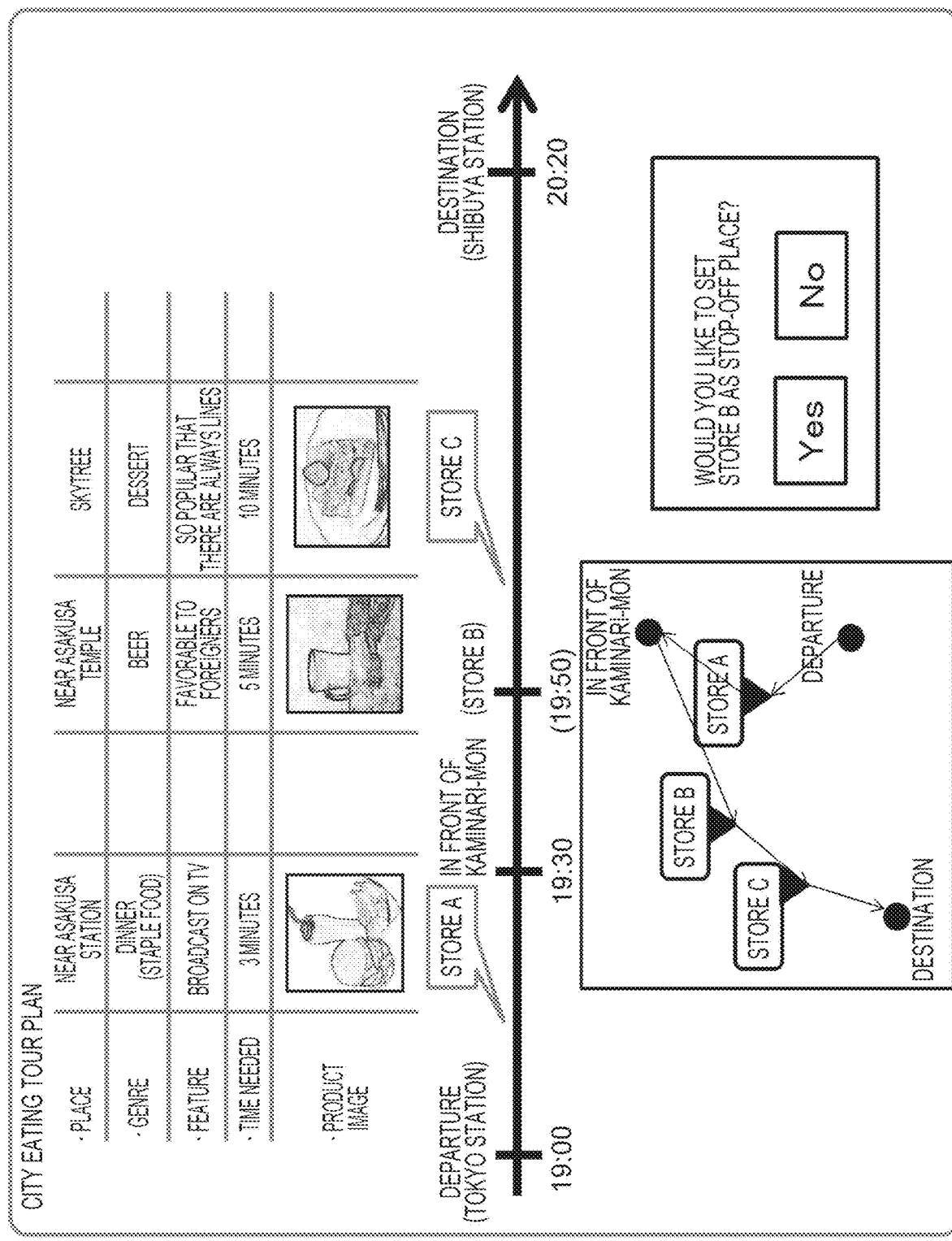
FIG. 5 is a diagram illustrating an example in which a GUI screen of FIG. 4 is updated as a store is selected (provisionally set).

FIG. 5 illustrates a GUI screen in which the display of the expected arrival time and the like is updated as the icon of the "store B" is selected. For example, the icon of the "store B" on the traveling route or the icon of the "store B" in the time axis display indicating the route plan is assumed to be selected as the stop-off place. Here, when the manipulation of selecting the icon of the store is performed, it is a provisionally set state, and it is not a confirmed state. In the example illustrated in FIG. 5, the icon display of the store B in the time axis display indicating the route plan is changed to display in parentheses, and it indicates that it is provisionally set. Further, in a case in which the current place of the vehicle, the stop-off place, the store B, and the destination are included in the traveling route, the calculation unit 105 re-calculates the expected arrival time to each spot, and updates the display of the expected arrival time to each spot on the time axis of the GUI screen. The expected arrival time to the store B in the provisionally set state is displayed in parentheses.

Further, in the GUI screen illustrated in FIG. 5 in which the "store B" is provisionally set, a dialog box for confirming, by the passenger, that the store B is set as the stop-off place appears. In the example illustrated in FIG. 5, in the dialog box, a message "Would you like to set store B as a stop-off place?" is displayed, and a "Yes" button for confirming the setting and a "No" button for declining the settings are arranged.

If the passenger selects the "Yes" button in the dialog box, it is confirmed that the store B is set as the stop-off place. Then, on the GUI screen, as illustrated in FIG. 6, the dialog box disappears, the parentheses disappear from the displays of the store B and the estimated arrival time thereto, and it indicates that the "store B" has been confirmed as the stop-off place.

Steps S204 and S205 are processes in a case in which the passenger sets the stop-off place by manipulating the icon of the store on the GUI screen illustrated in FIG. 4. On the other hand, the passenger can select a cell of a product image on the matrix displayed on GUI screen and select a place (store) corresponding to the cell and the product or the service to be used in the store at the same time. Here, the selection of the cell on the matrix is a provisional set state, and it is not a confirmed state. If the cell of the product is selected, the calculation unit 105 re-calculates the expected arrival times to the stop-off place and each store in a case in which the traveling route in which the store is further included as the stop-off place is set in view of the current place of the vehicle, the destination, and an expended time of the product or the service selected in the corresponding store (for example, a time necessary for having a meal selected in the store), and updates the display of each expected arrival time on the time axis of the GUI screen. Here, the "expended time" refers to a time taken until the product is received, a time in which the service is provided, a time taken until the passenger returns and gets on the vehicle after getting off the vehicle and receiving the product, a time according to a distance between a parking lot in which the vehicle is scheduled to park and the store, a time taken until the product is consumed after the product is received (for example, a time taken to eat up an ordered dish), or the like, and the "expended time" is assumed to be set for each store, each product, or each service in advance in view of various times or distances (the same hereinafter). Here, at the stage of step S204, the product or the service are not yet selected as only the store is selected, and thus the expended time in consideration of the time required to consume the product or the service in the store is assumed to be used for calculating the expected arrival time.

Figure 6:
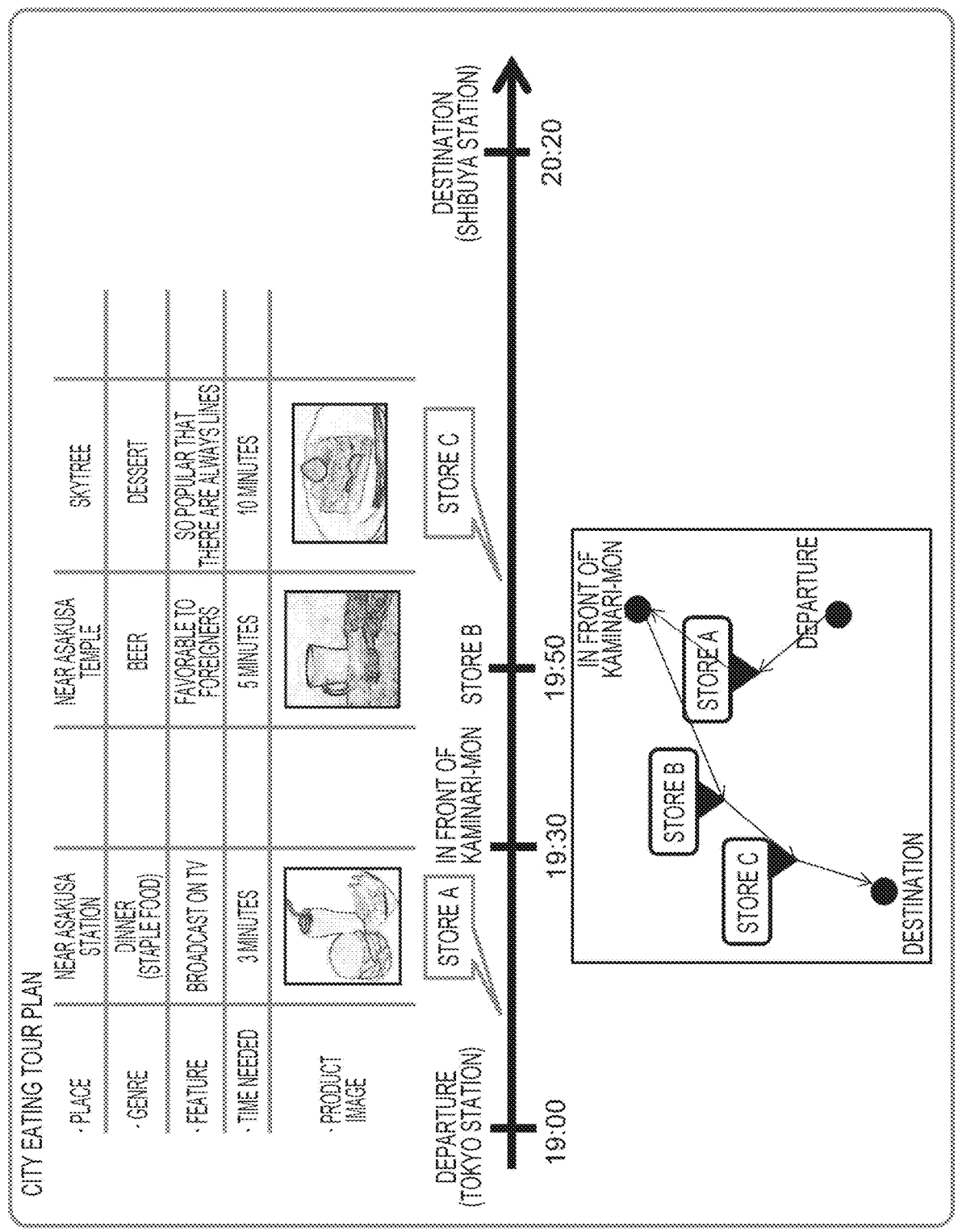
FIG. 6 is a diagram illustrating an example in which a GUI screen of FIG. 5 is updated as selection of a store is confirmed (provisionally set).
Figure 7:
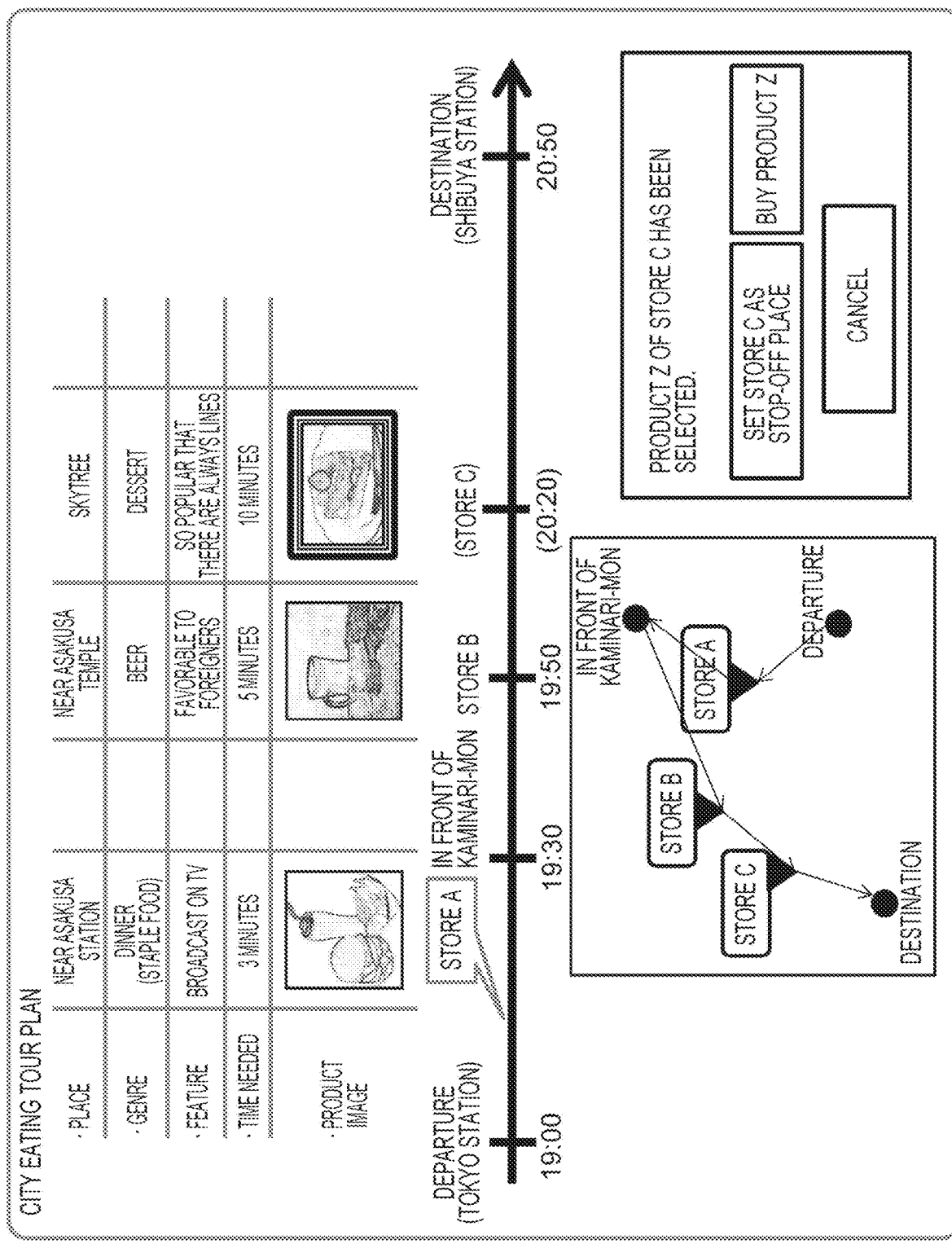
FIG. 7 is a diagram illustrating an example in which a GUI screen of FIG. 6 is updated as a cell of a product is selected (provisionally set).

FIG. 7 illustrating a GUI screen updated as the passenger selects the cell of e "product Z" of the "store C" on the matrix in the GUI screen of FIG. 6. In the time axis illustrating the route plan, the "store C" is provisionally set as the stop-off place newly, and switching from the icon display to display in parentheses is performed. Further, the expected arrival time to each spot in a case in which the current place, the stop-off place, the previous confirmed store B, the store C, and the destination are included in the traveling route is updated. The expected arrival time to the store C in the provisionally set state is displayed in parentheses.

Further, in the GUI screen illustrated in FIG. 7 in which the "product Z" which can be provided in the "store C" is provisionally set, a dialog box for confirming, by the passenger, whether or not the store C is set as the stop-off place or transition to the product Z purchase screen is performed appears. In the example illustrated in FIG. 7, in the dialog box, a message "product Z of store C has been selected." is displayed, and a button "set store C as stop-off place" for deciding setting of the stop-off place and a button "buy product Z" for proceeding to a product Z purchase procedure are arranged. Further, in the GUI screen illustrated in FIG. 7, the dialog box for proceeding to the purchase procedure for the product selected by the passenger is displayed, but a dialog box for making a reservation instead of purchasing the product may be displayed, and a reservation procedure may proceed.

Here, when the parental control function is introduced, and the passenger determined as not having sufficient responsibility such as a child performs a GUI manipulation, the button "buy product Z" may be displayed in an inactive state so that the button is unable to be selected. The passenger restricted by the parental control function can view information of the store and the product or the service which can be provided but is unable to place an order by her/himself.

Figure 8:
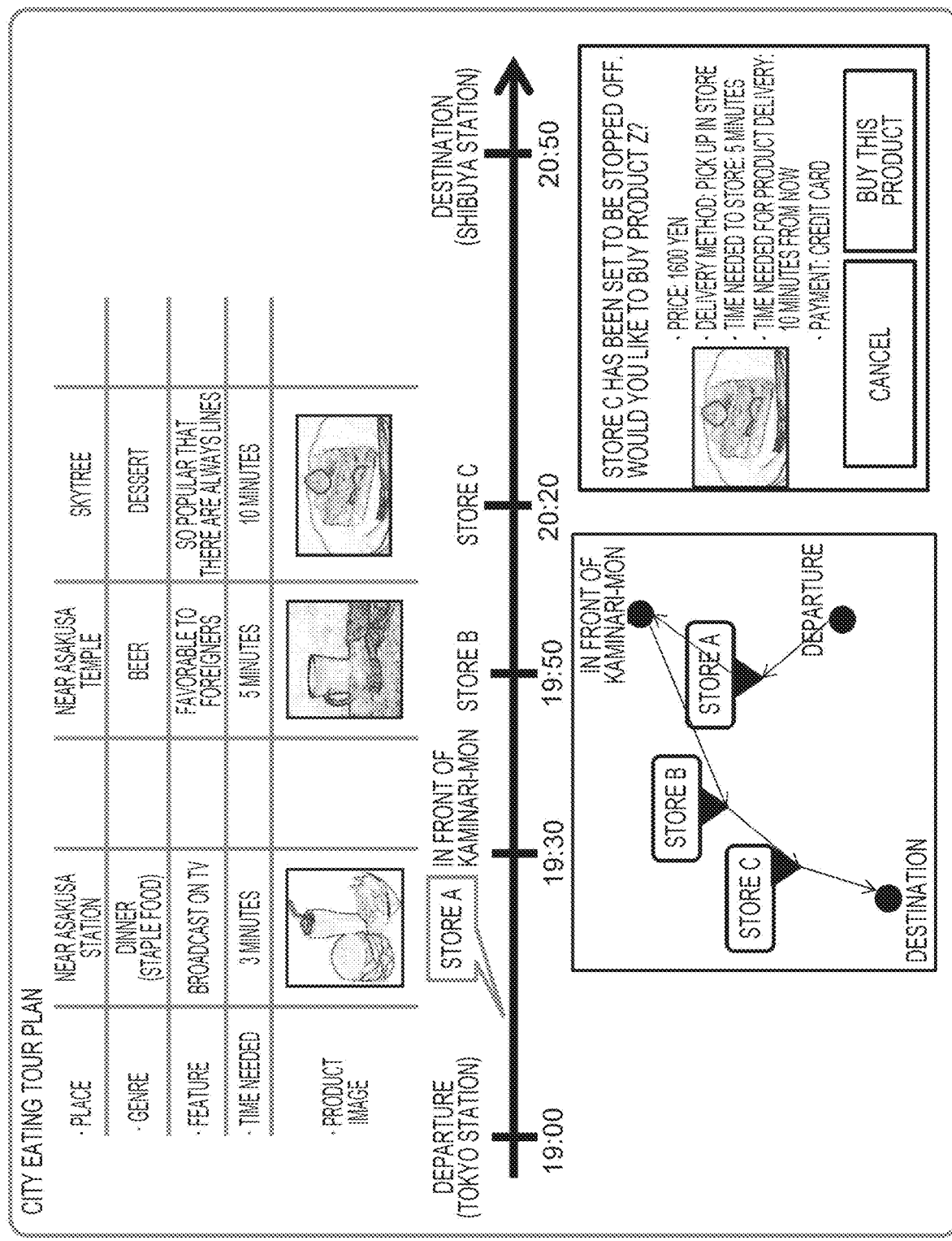
FIG. 8 is a diagram illustrating an example in which a GUI screen of FIG. 7 is updated as a store is newly confirmed as a stop-off place.

In the GUI screen of FIG. 7, the passenger selects the "set store C as stop-off place" button, and the "store C" is confirmed as the stop-off place. FIG. 8 illustrates a GUI screen updated as the "store C" is newly confirmed as the stop-off place. The parentheses disappear from the displays of the store C and the estimated arrival time thereto, and it indicates that the "store C" is confirmed as the stop-off place.

Further, it is confirmed that stopping off in the "store C," is performed but the product or the service to be used in the store is not confirmed yet. In this example, the purchase of the cell "product Z" selected by the passenger is not confirmed in the GUI screen of FIG. 8. In this regard, a dialog box for confirming, by the passenger, whether or not the product Z is purchased appears newly. In the example illustrated in FIG. 8, in the dialog box, a message "store C has been set to be stopped off. Would you like to buy product Z?" and detailed information related to conditions for purchasing the product Z or the like such as a price, a delivery method, a time to store, a time needed for product delivery, and a payment method are displayed, and a button "cancel" for giving an instruction to cancel the purchase of the product Z and a button "buy product Z" for confirming the purchase of the product Z are arranged. If the "cancel" button is selected, the purchase of the product Z is canceled, and the "store C" may be canceled from the stop-off place as well.

Here, when the parental control function is introduced, and the passenger determined as not having sufficient responsibility such as a child performs a GUI manipulation, the button "buy product" may be displayed in an inactive state so that the button is unable to be selected. The passenger restricted by the parental control function can view information of the store and the product or the service which can be provided but is unable to purchase or place a reservation order by her/himself.

If the passenger selects the "buy this product" button in the dialog box, the purchase process is completed with the price and the payment method (credit card payment or the like) stated in the dialog box. Thereafter, it is possible to receive the product Z through the delivery method described in the dialog box. In addition, as a modified example, instead of a time point at which the "set store C as stop-off place" button is selected in the dialog box illustrated in FIG. 7, after the "buy this product" button is selected in the dialog box illustrated in FIG. 8, the purchase of the product Z may be confirmed, and the store C may be confirmed as the stop-off place. In this modified example, it is not necessary to arrange the "set store C as stop-off place" button in the dialog box.

In the GUI screen of FIG. 8, when the passenger selects the "buy this product" button, the purchase of product Z is confirmed. In the background, the payment process is completed between the store C and the vehicle (or the passenger). Then, information identifying the vehicle (a vehicle ID, a vehicle type, a vehicle color, and the like), information of purchaser (the passenger), a delivery time, and a delivery method are transmitted from the vehicle to the store C. On the store C side, preparation for delivering the purchased product Z (for example, cooking of an ordered menu, or the like) is started. The delivery time of the product Z may be set in advance but may be decided through negotiation between the vehicle and the store C after the purchase is confirmed. In addition, in the GUI screen illustrated in FIG. 7, a dialog box for making a reservation instead of purchasing the product may be displayed, and a procedure for confirming the reservation may be executed in the GUI screen illustrated in FIG. 8. Further, the payment process may be performed by making an advance payment of all or a part of the product purchase price as a reservation fee.

Figure 9:
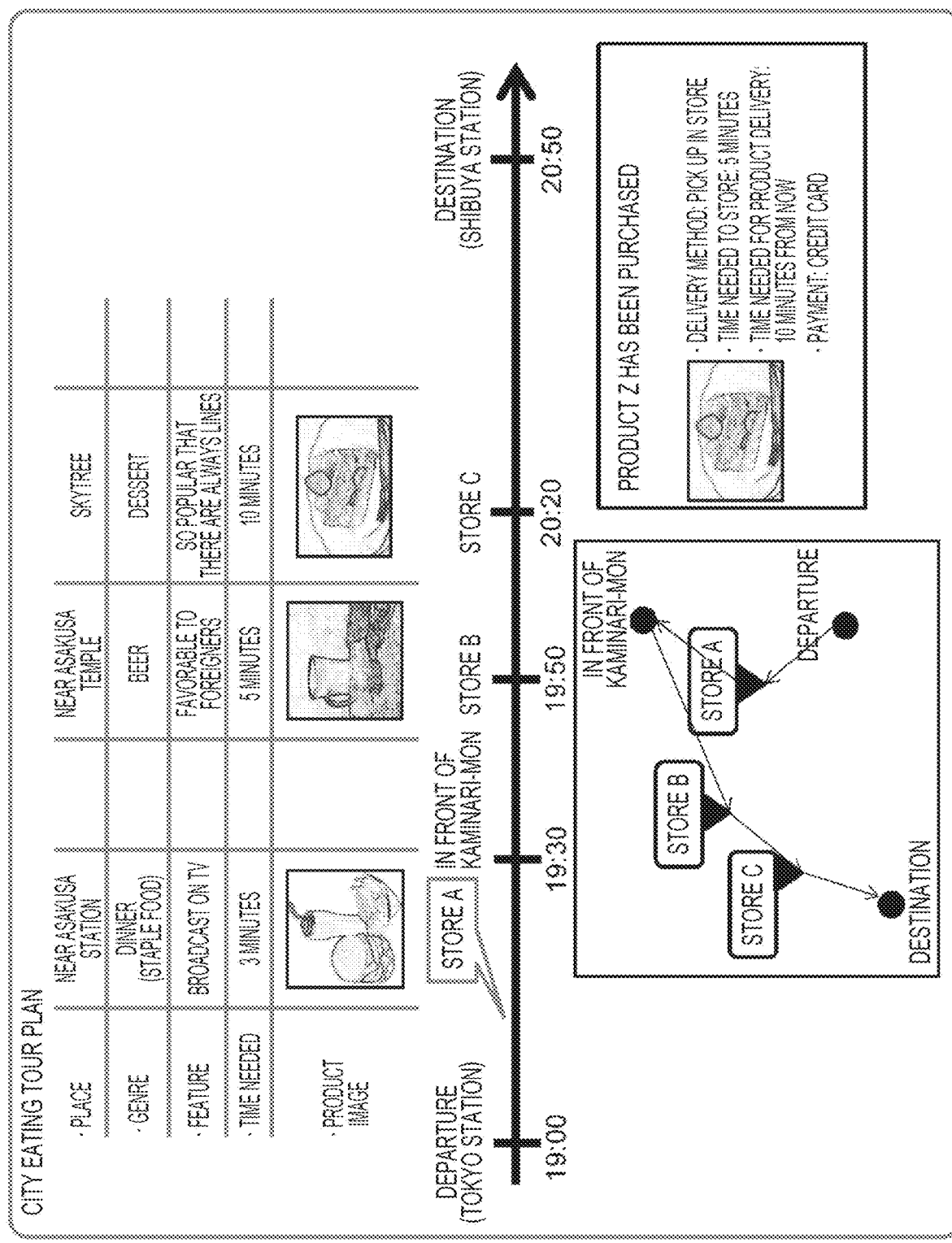
FIG. 9 is a diagram illustrating an example in which a GUI screen of FIG. 8 is updated as a product or a service to be used in a store confirmed as a stop-off place is confirmed.

As the purchase of the product Z in the store C is confirmed, a popup window indicating that the product Z has been purchased or information related to the delivery method is displayed on the GUI screen as illustrated in FIG. 9. In the example illustrated in FIG. 9, a message "product Z has been purchased" and detailed information related to delivery or the like of the product Z such as a delivery method, a time to store, a time needed for product delivery, and a payment method are displayed in the popup window. Further, on the time axis indicating the route plan, a word balloon indicating the completion of the purchase of the product Z, the delivery time, and the like is added to the "store C." Note that, even in a case in which the passenger may select the "buy product Z" button in the GUI screen illustrated in FIG. 7, a similar screen transition may be performed. Further, in a case in which the reservation procedure other than the product purchase is performed in the GUI screen illustrated in FIGS. 7 and 8, a message indicating that the reservation other than the product purchase has been confirmed is displayed even in the GUI screen illustrated in FIG. 9.

Note that, although not illustrated in FIG. 9, the remaining time to timely receive the product or the service for which the payment process has been completed (or the order has been confirmed) may be displayed using a progress bar or the like.

The processing procedure in which the information processing device 100 performs the information presentation in the vehicle will be further described with reference back to FIG. 2.

In a case in which a certain product or service is selected through a manipulation or the like of selecting any one cell on the matrix displaying information related to each store other than a manipulation of selecting an icon of a store or a selected product or service is paid for on the GUI screen illustrated in FIG. 4 (Yes in step S206), the traveling route in which the store is further included as the stop-off place is reset in view of the current place of the vehicle, the destination, and the expanded time of the selected product or service in the store, the expected arrival times to the stop-off place and each store are re-calculated, and the display of each expected arrival time on the time axis of the GUI screen is updated (step S207). At this stage, since the product or the service consumed by the store has been also selected already, the expected arrival time is calculated in consideration of the expended time corresponding to the selected product or the service.

Note that, in step S206, it is assumed that a predetermined store is set as a destination, that a purchase of the product or the service is decided, and that the product or the service is paid for between the passenger and the store.

Further, in step S207, the store selected in step S206 is confirmed as the destination (stop-off place), and the traveling route of the vehicle is reset. The setting of the traveling route of the vehicle includes both setting a transit point, a destination, and a traveling route in a vehicle in an automatic driving mode and setting a transit point, a destination, and a traveling route on an application related to navigation in a vehicle in a manual driving mode.

FIG. 10 is a flowchart illustrating a processing procedure executed in step S203 in the flowchart illustrated in FIG. 2 for displaying the stores on the traveling route and the products or the services which can be provided in each store on the GUI screen in further detail.

First, the calculation unit 105 decides the purpose of boarding, the plan, the final destination, the stop-off place, and the boarding time on the basis of information input by the passenger through the GUI screen displayed in step S202 (step S1001). FIG. 3 illustrates an example of the GUI screen in which "eating tour" is input as the purpose of boarding, "city tour" is input as the boarding course (plan), "Shibuya station" is input as the final destination, and "in front of Kaminari-mon" and "21:00" are set as the stop-off place and the boarding time, respectively, in accordance with the input information.

Then, the calculation unit 105 searches for the traveling route on the basis of the current place of the vehicle and the final destination and the stop-off place set in step S1001, and calculates the expected arrival times to the stop-off place and the final destination (step S1002).

Then, the calculation unit 105 compares the expected arrival time to the final destination with the boarding time input from the passenger in step S201, and determines whether or not the expected arrival time is earlier than the boarding time (21:00 in the example illustrated in FIG. 3) by a predetermined time (for example, 15 minutes) (step S1003).

Here, in a case in which the expected arrival time is later than the boarding time by a predetermined time (No in step S1003), the process returns to step S1002, and the calculation unit 105 re-searches for the traveling route, and re-calculates the expected arrival time on the basis of the re-searched traveling route.

On the other hand, in a case in which the expected arrival time is earlier than the boarding time by a predetermined time, the calculation unit 105 calculates a time which the passenger can spend in other stop-off places in accordance with a difference between the expected arrival time and the boarding time (Step S1004).

For example, if the process of step S1004 is described using the example illustrated in FIG. 3, for example, in a case in which the expected arrival time to the Shibuya station which is the final destination is 20:00, one hour can be calculated as a time in which the passenger can spend in other stop-off places in accordance with the difference from 21:00.

Then, the calculation unit 105 narrows down (screens) the stores to be presented to the passenger and the products or the services presented as providable in each store on the basis of the traveling route set in step S1002, an average time needed for delivering the (providable) products or the services associated with each store, the boarding time zone, the preference of the passenger, and the like (step S1005). The GUI screen as illustrated in FIG. 4 is then displayed on the display unit 102 on the basis of the result of narrowing down. Further, conditions in which the screening for the stores and the products or the services is performed have been described above.

For example, as a result of determination that an additional time to stop off is one hour, stores associated with the "eating tour" which is the purpose of boarding are listed near the currently searched traveling route. One or more attributes of each store (sightseeing, date, eating tour, shopping, or the like) corresponding to the purpose of boarding may be associated and managed in a database in advance, and the calculation unit 105 may narrow down the stores with reference to the database at the time of screening.

The calculation unit 105 narrows down the stores from the stores suitable for the purpose of boarding of the passenger using the following methods (1), (2), (3), and (4).

(1) For each of the listed stores, the stores in which the average time needed related to the delivery of the product or the service set in the store in advance is shorter than a time which can be spent in the stop-off place are narrowed down as candidates.

(2) For each of the narrowed-down stores, it is determined whether or not it is possible to arrive at the destination before the boarding time even in a case in which the time needed is spent in the store in view of the average time needed related to the delivery of the product or the service set in the store and the expected arrival time to the final destination in a case where the store is stopped off. Then, the stores in which it is determine that arrival at the final destination before the expected arrival time is possible are narrowed down as candidates.

(3) The stores associated with the boarding time zone from the current place to the destination are narrowed down as candidates. For example, if the time is 19:00, it is determined as a time zone suitable for dinner, and the stores associated with "dinner" are narrowed down as candidates.

(4) The stores that can provide the products or the services associated with an attribute suitable for the preference of the passenger among the items of the products or the services associated with the listed stores are narrowed down as candidates in view of the preference of the passenger. For example, in a case in which sake and sweets are registered as the preference of the passenger, stores which are associated with the products or the services associated with the attributes of "beer" (belonging to a sub category of sake) and "sweets" are selected in consideration of the time zone in which the products or the services can be provided (data is acquired from the store in advance). For example, in a case in which a store is associated with the beer, but the expected arrival time to the store is not in a time zone in which the beer can be provided, the store is excluded from the candidate.

Then, various kinds of information of each of the stores selected as a result of further narrowing down (the stores A to C in the example illustrated in FIG. 3) are presented to the passenger through the GUI screen. As various kinds of information here, a place of the store, a genre related to the products or the services provided in the store, a time taken until the passenger can receive the product or the service and then leave after the vehicle arrives at the delivery place, an image of a representative product, a feature of a representative product, and the like are displayed.

Note that the store suitable for the purpose of boarding such as "eating tour" is specifically a store that can provide food and drink. In selecting the store suitable for the eating tour, various kinds of information items such as a place, a genre, a feature, and a product image are displayed in the matrix form as illustrated in FIG. 4, and each cell is in a selectable state. If a certain cell is selected, associated other items are simultaneously displayed together with items corresponding to the cell. For example, if the cell of the product image is selected, the place (the store that provides it), the genre, and the feature are dealt as being selected at the same time.

As described above, according to the technology disclose in this specification, the passenger of the vehicle can select the stop-off places such as the store on the traveling route from the departure or the current place to the final destination through the GUI manipulation using the information processing device 100 in the vehicle, view information of the products or the services available in the store, and decide to use the products or the services (purchase the products or the like). Further, the passenger can sequentially check a schedule (the expected arrival times to the corner stop-off place and the destination) changed as it is selected to stop off in the store or the product or the service is used.

The technology disclosed in this specification can be applied to all vehicles in the automatic driving mode and the manual driving mode. The passenger of the vehicle can set the transit point, the destination, and the traveling route through the GUI screen under the automatic driving mode and can set the transit point, the destination, and the traveling route on a navigation-related application under the manual driving mode.

Additionally, automatic driving can be defined as a driving mode in which the vehicle autonomously travels to a designated destination while recognizing the surrounding environment of the vehicle using a sensing device such as a radar, a LIDAR, a GPS, or an in-vehicle camera. With the further spread of the advanced safe driving system (ADAS) in the future, because of the improvement of social infrastructure such as introduction of dedicated driving lanes or lane sections in which the driver need not intervene, further relaxation of regulations in which the driver is allowed to be separated from vehicle control, and the like, for example, it is expected that vehicles which performs fully automatic driving will appear in public roads in the near future.

In the vehicle in the fully automatic driving mode, since all the passengers are completely separated from the vehicle control, the passenger compartment becomes a living space similar to a living room of a house. The passengers can go to the final destination with little consciousness that they are in the vehicle but can set the stop-off places such as the store through the GUI manipulation using the information processing device 100 and confirm the product or the service desired to use in the store in the vehicle (processes such as ordering or paying). Further, since the stores and the products or the services which are screened in accordance with the purpose of boarding, the boarding course, the preference of the passenger, the budget, and the like are presented through the GUI screen, the passenger can enjoy selecting the stop-off place or the product or the service without feeling troublesome, that is, viewing unnecessary information.

INDUSTRIAL APPLICABILITY

The technology disclosed in this specification has been described above in detail with reference to the specific embodiments. However, it is obvious that those skilled in the art can make modifications and substitutions of the embodiments without departing from the spirit of the technology disclosed in this specification.

The technology disclosed in this specification can be applied to various vehicles including automobiles (including gasoline and diesel vehicles), electric vehicles, hybrid electric vehicles, motorcycles, bicycles, personal mobility devices, and the like. Further, the technology disclosed in this specification can be applied to various forms of mobile objects (such as robots) that can generate driving force for traveling on roads.

In short, the technology disclosed in this specification has been described by way of examples, and the content of this specification should not be interpreted restrictively. In order to determine the gist of the technology disclosed in this specification, the scope of claims set forth below should be taken into consideration.

Note that the technology disclosed in this specification may have the following configurations.

(1) An information processing device, including:

a presenting unit that presents information related to a store which can be stopped off from a traveling route of a mobile object together with an expected arrival time; and a processing unit that acquires information related to a product or a service provided by a store presented by the presenting unit and processes a procedure for reserving or purchasing the product or the service with an external device on the basis of selection of a user.

(2) The information processing device according to (1), in which the presenting unit performs control such that the information related to the store is chronologically displayed in accordance with the expected arrival time.

(3) The information processing device according to (1), in which the traveling route is decided on the basis of the selection of the user on the information related to the store presented by the presenting unit.

(4) The information processing device according to (1), in which the presenting unit updates the expected arrival time such that an expended time of the product or the service in the corresponding store is considered in response to selection of the information related to the store presented by the presenting unit or selection of the information related to the product or the service.

(5) The information processing device according to (1), in which the presenting unit presents the information related to the store including at least one of a place in which the product or the service is provided, a provision method, or a provision date and time together with the expected arrival time.

(6) The information processing device according to (5), in which the presenting unit presents an expected arrival time to a final destination of the mobile object with reference to an expended time in the store set as a transit point of the mobile object.

(7) The information processing device according to (6), in which the presenting unit acquires the expended time in the store in accordance with the product or the service selected by the user and presents the expected arrival time to the final destination of the mobile object.

(8) The information processing device according to (7), in which the presenting unit updates the transit point or the destination of the mobile object as the procedure for reserving or purchasing the product or the service is processed.

(9) The information processing device according to (1), in which the procedure for reserving or purchasing the product or the service includes a process of deciding at least a date and time at which the product or the service is provided, and the presenting unit displays a remaining time corresponding to the date and time at which the product or the service is provided.

(10) The information processing device according to (1), in which the presenting unit selects the information related to the store which performs presentation in accordance with a moving purpose, a preference of the user, or an expected getting-off time (a maximum time to be able to ride in the mobile object) input by the user or a transit point or a destination previously set as the traveling route of the mobile object.

(11) The information processing device according to (1), in which the presenting unit presents the information related to the store including the information related to the product or the service provided by the store.

(12) The information processing device according to (1), further including, a communication unit that communicates with the external device, in which the communication unit transmits information related to a provision date and time or a place of the product or the service to the external device in response to the selection of the user.

(13) The information processing device according to (1), in which the presenting unit presents the information related to the store in view of an expected arrival time to the store and a time required to provide the product or the service provided by the store.

(14) The information processing device according to (13), in which the presenting unit presents information indicating that the product or the service is providable before the expected arrival time or information indicating that a standby time is required before the product or the service is provided after the expected arrival time.

(15) The information processing device according to (1), in which the presenting unit presents the information related to the store in accordance with the number of persons in the mobile object.

(16) The information processing device according to (1), in which the presenting unit presents a commercial facility which can be stopped off from the traveling route, a destination, and the expected arrival time on the basis of a purpose of boarding, an area which is desired to pass through while boarding, a budget spendable for using an item, a final destination, and a boarding time input by the user.

(17) An information processing method, including:

a presenting step of presenting information related to a store which can be stopped off from a traveling route of a mobile object together with an expected arrival time; and a processing step of acquiring information related to a product or a service provided by a store presented by the presenting unit and processing a procedure for reserving or purchasing the product or the service with an external device on the basis of selection of a user. (18) A mobile object, including:

a driving unit that generates driving force;

a presenting unit that presents information related to a store which can be stopped off from a traveling route together with an expected arrival time; and a processing unit that acquires information related to a product or a service provided by a store presented by the presenting unit and processes a procedure for reserving or purchasing the product or the service with an external device on the basis of selection of a user.

REFERENCE SIGNS LIST

100 Information processing device
101 Input unit
102 Display unit
103 Position information acquiring unit
104 Communication unit
105 Calculation unit
106 Vehicle interior state detecting unit
107 Vehicle exterior information detecting unit
108 Vehicle state detecting unit

The invention claimed is:
1. An information processing device, comprising:
  a presenting unit configured to present first information related to a store on a traveling route of a vehicle along with an expected arrival time of the vehicle,
    wherein the presentation of the first information is based on detection of a user in the vehicle; and
  a processing unit configured to:
    acquire, based on the presentation of the first information, second information related to one of a first product or a first service provided by the store;
    determine whether a user restriction is set to one of reserve or purchase one of the first product or the first service, wherein the determination is based on user information related to the user;
control, based on the determination that the user restriction is set, the presenting unit to present the second information related to one of the first product or the first service in a state in which selection of one of the first product or the first service for one of the reservation or the purchase is disabled;
execute a procedure to one of reserve or purchase one of the first product or the first service with an external device,
wherein the execution of the procedure is based on:
the determination that the user restriction is not set, and
the selection of one of the first product or the first service;
estimate a usage status of one of the first product or the first service based on an image captured by a camera of the vehicle; and
control, based on the estimated usage status, the presenting unit to present third information related to one of a second product or a second service.

2. The information processing device according to claim 1, wherein the presenting unit is further configured to control the presentation of the first information related to the store such that the first information related to the store is chronologically displayed based on the expected arrival time.

3. The information processing device according to claim 1, wherein the processing unit is further configured to determine the traveling route based on selection of the user on the first information related to the store presented by the presenting unit.

4. The information processing device according to claim 1, wherein the presenting unit is further configured to update the expected arrival time such that an expended time of one of the first product or the first service in the store is considered in response to one of selection of the first information related to the store presented by the presenting unit or the selection of one of the first product or the first service.

5. The information processing device according to claim 1, wherein the presenting unit is further configured to present:
the first information related to the store including at least one of a place in which one of the first product or the first service is provided, a provision method, or a provision date and time, and
the expected arrival time.

6. The information processing device according to claim 5, wherein the presenting unit is further configured to present the expected arrival time to a final destination of the vehicle with reference to an expended time in the store set as a transit point of the vehicle.

7. The information processing device according to claim 6, wherein the presenting unit is further configured to:
acquire the expended time in the store based on one of the first product or the first service selected by the user; and
present the expected arrival time to the final destination of the vehicle.

8. The information processing device according to claim 7, wherein the presenting unit is further configured to update at least one of the transit point or the final destination of the vehicle as the procedure to one of reserve or purchase one of the first product or the first service.

9. The information processing device according to claim 1, wherein the processing unit is further configured to:

determine at least a date and time at which one of the first product or the first service is provided; and
control display of a remaining time corresponding to the date and time at which one of the first product or the first service is provided.

10. The information processing device according to claim 1, wherein the presenting unit is further configured to select the first information related to the store based on at least one of a moving purpose, a preference of the user, or an expected getting-off time input by the user, a transit point, or a destination previously set as the traveling route of the vehicle.

11. The information processing device according to claim 1, wherein the presenting unit is further configured to present the first information related to the store including the second information related to one of the first product or the first service of the store.

12. The information processing device according to claim 1, further comprising a communication unit configured to:
communicate with the external device; and
transmit fourth information related to one of a provision date and time or a place of one of the first product or the first service to the external device in response to the selection.

13. The information processing device according to claim 1, wherein the presenting unit is further configured to present the first information related to the store based on the expected arrival time to the store and a time required to provide one of the first product or the first service of the store.

14. The information processing device according to claim 13, wherein the presenting unit is further configured to present at least one of fifth information indicating that one of the first product or the first service is providable before the expected arrival time or sixth information indicating that a standby time is required before one of the first product or the first service is provided after the expected arrival time.

15. The information processing device according to claim 1, wherein the presenting unit is further configured to present the first information related to the store based on a number of persons in the vehicle.

16. The information processing device according to claim 1, wherein the presenting unit is further configured to present a commercial facility which is on the traveling route, a destination, and the expected arrival time based on at least one of a purpose of boarding, an area which is desired to pass through while boarding, a budget spendable for an item, a final destination, or a boarding time input by the user.

17. An information processing method, comprising:
controlling presentation of first information related to a store on a traveling route of a vehicle along with an expected arrival time of the vehicle,
wherein the presentation of the first information is based on detection of a user in the vehicle;
acquiring, based on the presentation of the first information, second information related to one of a first product or a first service provided by the store;
determining whether a user restriction is set to one of reserve or purchase one of the first product or the first service,
wherein the determination is based on user information related to the user;
controlling, based on the determination that the user restriction is set, presentation of the second information related to one of the first product or the first service in a state in which selection of one of the first product or the first service for one of the reservation or the purchase is disabled;

executing a procedure to one of reserve or purchase one of the first product or the first service with an external device,
  wherein the execution of the procedure is based on:
    the determination that the user restriction is not set, and
    the selection of one of the first product or the first service;

estimating a usage status of one of the first product or the first service based on an image captured by a camera of the vehicle; and controlling, based on the estimated usage status, presentation of third information related to one of a second product or a second service.

18. A mobile object, comprising:

a driving unit configured to generate a driving force;

a presenting unit configured to present first information related to a store on a traveling route along with an expected arrival time of the mobile object,
  wherein the presentation of the first information is based on detection of a user in the mobile object;

a camera configured to capture an image; and a processing unit configured to:
  acquire, based on the presentation of the first information, second information related to one of a first product or a first service provided by the store;
  determine whether a user restriction is set to one of reserve or purchase one of the first product or the first service,
    wherein the determination is based on user information related to the user;
  control, based on the determination that the user restriction is set, the presenting unit to present the second information related to one of the first product or the first service in a state in which selection of one of the first product or the first service for one of the reservation or the purchase is disabled;
  execute a procedure to one of purchase or reserve one of the first product or the first service with an external device,
    wherein the execution of the procedure is based on:
      the determination that the user restriction is not set, and
      the selection of one of the first product or the first service;
  estimate a usage status of one of the first product or the first service based on the image captured by the camera; and
  control, based on the estimated usage status, the presenting unit to present third information related to one of a second product or a second service.

* * * * *